United States Patent [19]
Wittkop et al.

[11] Patent Number: 5,031,729
[45] Date of Patent: Jul. 16, 1991

[54] TOWED VEHICLE REMOTE BRAKE APPLICATION MEANS FOR USE WITH A TOWING VEHICLE

[76] Inventors: Jeffrey Wittkop, 85 N. Main St., Pennington, N.J. 08534; William Leonhauser, 858 W. Gillam Ave., Langhorne, Pa. 19047

[21] Appl. No.: 483,694

[22] Filed: Feb. 23, 1990

[51] Int. Cl.$^5$ .................................................. B60T 7/02
[52] U.S. Cl. ..................................... 188/3 H; 74/532; 188/112 R; 254/DIG. 5; 280/432
[58] Field of Search .................. 188/2 R, 3 H, 112 R; 74/532; 280/432; 254/DIG. 5

[56] References Cited

U.S. PATENT DOCUMENTS

| | | |
|---|---|---|
| 1,596,834 | 8/1926 | Herbert et al. .......................... 74/532 |
| 1,681,380 | 8/1928 | Taman ..................................... 74/532 |
| 1,783,902 | 12/1930 | Brost ....................................... 74/532 |
| 2,177,469 | 10/1939 | White . |
| 2,207,228 | 7/1940 | Seppmann . |
| 2,711,228 | 6/1955 | Shank . |
| 3,204,725 | 9/1965 | McGraw, Jr. . |
| 3,226,997 | 1/1966 | Malloy .................................... 74/532 |
| 3,318,422 | 5/1967 | Frescura . |
| 3,580,609 | 5/1971 | Paielli ................................. 280/407.1 |
| 3,650,570 | 3/1972 | Meeks . |
| 3,740,102 | 6/1973 | Schwerin . |
| 3,866,719 | 2/1975 | Streutker . |
| 3,910,135 | 10/1975 | Phillips .................................... 74/532 |
| 4,635,758 | 1/1987 | Beard, Jr. . |
| 4,756,390 | 7/1988 | Meadows . |

Primary Examiner—George E. A. Halvosa
Attorney, Agent, or Firm—Sperry, Zoda & Kane

[57] ABSTRACT

The brakes of a towed vehicle can be applied remotely responsive to braking of the towing vehicle. An air compressor driven by the motor of the towing vehicle can supply compressed air to a compressed air storage tank with a pneumatic line extending from the compressed air storage tank rearwardly to a braking assembly which is positioned in the passenger compartment of the towed vehicle. The braking assembly is adjustable and includes a rod positioned between the steering wheel and the brake pedal of the towed vehicle and is secured to both. A pneumatic control device is connected to the pneumatic line to receive a signal therethrough to actuate the braking assembly through an actuation device such as a pneumatic piston to exert pressure to expand the length of the bar and apply the brakes of the towed vehicle. An air release valve in the bar assembly can exhaust air from the pneumatic piston responsive to cessation of compressed air being supplied through the pneumatic line to facilitate immediate release of the brakes of the towed vehicle.

10 Claims, 2 Drawing Sheets

TOWED VEHICLE REMOTE BRAKE APPLICATION MEANS FOR USE WITH A TOWING VEHICLE

BACKGROUND OF THE INVENTION

1. Field Of The Invention

The present invention deals with the field of devices usable for facilitating control of movement of towed vehicle being transported by towing vehicles such as tow trucks or the like. With very heavy towed vehicles the tremendous increase in the momentum achieved by the increase of mass of the moving unit is a great strain upon the brakes of the towing vehicle. Therefore the present invention provides an easy, simple to install, quickly assemblable and disassemblable remote brake application system which is positionable within the passenger compartment of the towed vehicle to facilitate the application of brakes thereof simultaneously with the application of the brakes of the towing vehicle or selectively as desired.

2. Description Of The Prior Art

Many devices have been utilized for facilitating control such as steering or braking of vehicles being towed such as those shown in U.S. Pat. No. 2,177,469 patented Oct. 24, 1939 to J. W. White for a Brake; U.S. Pat. No. 2,207,228 patented July 9, 1940 to A. B. Seppmann on a Brake System; U.S. Pat. No. 2,711,228 patented June 21, 1955 to W. F. Shank on a Brake Actuating Device For Towed Vehicle; U.S. Pat. No. 3,204,725 patented Sept. 7, 1965 to J. R. McGraw, Jr. on a Brake Control Apparatus; U.S. Pat. No. 3,318,422 patented by May 9, 1967 to E. Frescura on a Tow Bar Controlled Brake Actuating Device For Towed Vehicles; U.S. Pat. No. 3,650,570 patented Mar. 21, 1972 to W. Meeks on a Hydraulically Actuated Braking System For Unitary Control Of Driven And Towed Vehicles; U.S. Pat. No. 3,740,102 patented June 19,1973 to G. Schwerin on a Motor Vehicle Braking Arrangement; U.S. Pat. No. 3,866,719 patented Feb. 18, 1975 to J. Streutker on a Remotely Controlled Brake System; U.S. Pat. No. 4,635,758 patented Jan 13,1987 to F. Beard, Jr. on a Hydraulic Control System For Simultaneous Application of Brakes Of Towing and Towed Vehicles With Equal Intensity; and U.S. Pat. No. 4,756,390 patented July 12, 1988 to L. Meadows on a Remote Braking System.

SUMMARY OF THE INVENTION

The present invention provides a towed vehicle remote brake application device particularly for use with a towing vehicle which includes a compressed air storage device attached with respect to the towing vehicle for accumulating a supply of compressed air. An air compressor is attached with respect to the tow vehicle and is preferably powered by the motor thereof. The air compressor is in fluid flow communication with respect to the compressed air storage device or tank to generate and supply compressed air therein.

A pneumatic line extends from the compressed air storage means and includes a towing vehicle end adjacent the compressed air tank and a towed vehicle end extending rearwardly to be positioned adjacent the towed vehicle. The towed vehicle end is in fluid flow communication with respect to the compressed air storage tank to receive compressed air as desired selectively therefrom.

A pneumatic switching device is movable between a closed position preventing compressed air flow through the pneumatic line means and an opened position allowing full flow of compressed air through the pneumatic line. Preferably the pneumatic switch will be operatively secured either manually or through the brake pedal of the towing vehicle itself such as to automatically operate the brakes of the towing vehicle and the towed vehicle simultaneously.

A braking assembly is included positioned within the passenger compartment of the towed vehicle such as to be positioned between the brake pedal and the steering wheel thereof. The braking assembly is adapted to selectively exert downwardly directed force against the brake pedal of the towed vehicle responsive to application of the brake pedal in the towing vehicle.

This brake assembly preferably includes a rod member positioned extending from the steering wheel of the towed vehicle to the brake pedal thereof. The rod member includes an upper and lower end. The upper end is preferably secured with respect to a steering wheel securement bracket which is adapted to be detachably securable with respect to the steering wheel of the towed vehicle to selectively secure the rod member thereto.

In a similar manner the lower end of the rod member is adapted to be secured with respect to a pedal securement bracket which is detachably securable with respect to the braking pedal of the towed vehicle to selectively secure the rod member thereto.

A pneumatic control means is secured with respect to the rod member and is in fluid flow communication with respect to the pneumatic line. This pneumatic control means is responsive to receiving pneumatic pressure through the towed vehicle end of the pneumatic line to extend the rod member between the steering wheel and the braking pedal of the towed vehicle and thereby exert downward bias against the braking pedal to apply the brakes. The pneumatic control means preferably takes the form of a pneumatic piston member which is adapted to expand responsive to applying compressed air thereto. An air release valve is preferably included operatively in fluid flow communication with respect to the pneumatic piston to exhaust the compressed air therefrom responsive to the cessation of compressed air being supplied through the pneumatic line.

Preferably the rod member itself is of adjustable length to facilitate usage of the remote brake application means of the present invention with a great variety of different sizes of towed vehicles.

The pedal securement bracket preferably includes a first and second plate each of which are attached with respect to a threaded engaging member for tightening the two plates with respect to one another and binding the brake pedal of the towed vehicle therebetween.

The steering wheel securement bracket preferably includes a U-shaped cradle which is adapted to bias against the undersurface of the steering wheel of the towed vehicle as well as an upper securement yoke which is attached with respect to the rod member to facilitate secure attachment between the steering wheel of the towed vehicle and the rod member. This upper securement yoke is preferably detachably securable with respect to the rod member and may take the form of a ring member movable along the rod member for facilitating adjustment of the longitudinal length between the upper and lower end thereof. A set screw may be positioned extending through the ring member to detachably engage by friction against the rod member itself to further facilitate adjustability of length between the pedal securement means and the steering wheel securement means of the towed vehicle.

It is an object of the present invention to provide a towed vehicle with remote brake application means for use with a towing vehicle wherein actuation of the brakes of the towing vehicle will simultaneously initiate braking of the towed vehicle.

It is an object of the present invention to provide a towed vehicle with remote brake application means for use with a towing vehicle wherein cessation of braking of the towing vehicle will simultaneously render the brakes of the towed vehicle temporarily inoperative.

It is an object of the present invention to provide a towed vehicle with remote brake application means for use with a towing vehicle wherein a brake control bar is positionable within the passenger compartment of the towed vehicle having adjustable lengths for use with variously sized towed vehicles.

It is an object of the present invention to provide a towed vehicle with remote brake application means for use with a towing vehicle wherein the compressed air normally available in towing vehicles is usable for controlling the braking operation of towed vehicles.

It is an object of the present invention to provide a towed vehicle with remote brake application means for use with a towing vehicle wherein an air release valve is utilized to facilitate termination of braking of the towed vehicle simultaneously with termination of braking of the towing vehicle.

It is an object of the present invention to provide a towed vehicle with remote brake application means for use with a towing vehicle wherein maintenance costs are minimized.

It is an object of the present invention to provide a towed vehicle with remote brake application means for use with a towing vehicle wherein initial capital outlay costs are minimized.

It is an object of the present invention to provide a towed vehicle with remote brake application means for use with a towing vehicle wherein down time is minimized.

It is an object of the present invention to provide a towed vehicle with remote brake application means for use with a towing vehicle wherein safety is greatly enhanced by increasing the braking capacity of a vehicle and towed vehicle combination.

It is an object of the present invention to provide a towed vehicle with remote brake application means for use with a towing vehicle wherein towing of heavy trucks such as dump trucks or cement trucks is made significantly safer.

It is an object of the present invention to provide a towed vehicle with remote brake application means for use with a towing vehicle wherein single axle wreckers can be utilized to tow excessively heavy towed vehicles normally requiring double axle wreckers.

It is an object of the present invention to provide a towed vehicle with remote brake application means for use with a towing vehicle wherein the equipment is completely portable.

It is an object of the present invention to provide a towed vehicle with remote brake application means for use with a towing vehicle wherein the compressor can be driven by gear or belt drive off the motor of the towing vehicle with one or more air tanks accumulating a compressed air supply.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
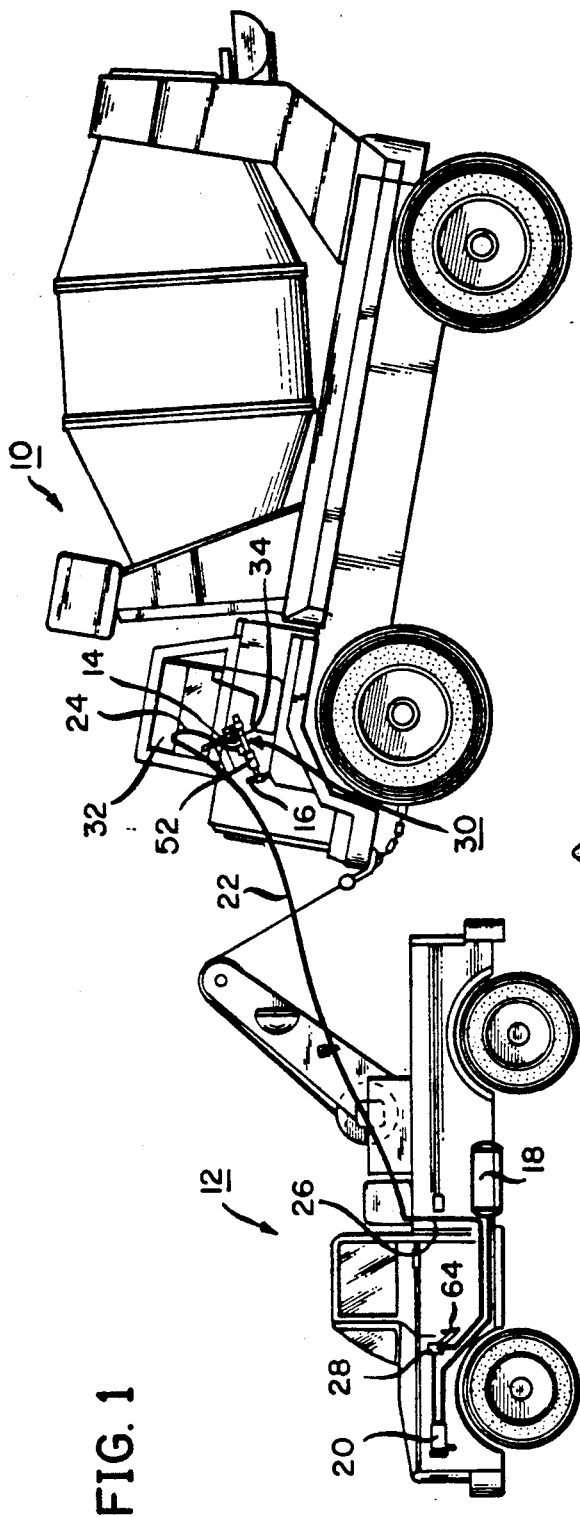
FIG. 1 is a schematic illustration of an embodiment of the towed vehicle remote brake application means for use with a towing vehicle of the present invention.
Figure 2:
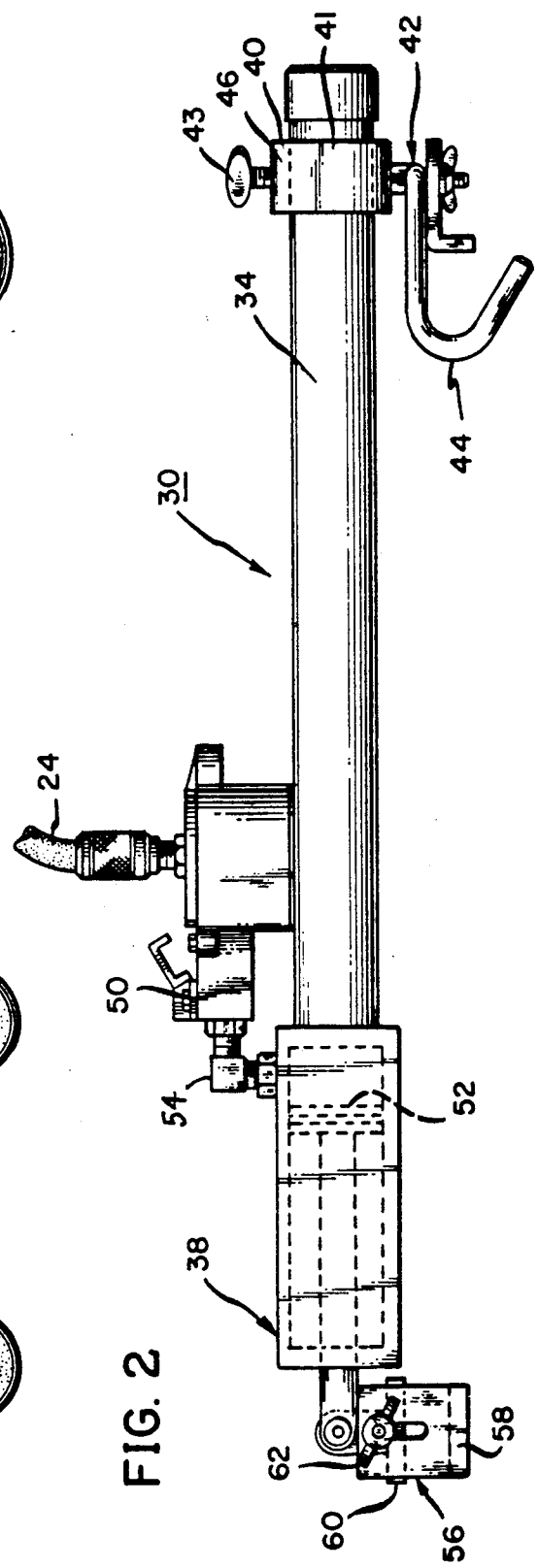
FIG. 2 is a side plan view of an embodiment of an embodiment of the braking assembly of the present invention.
Figure 3:
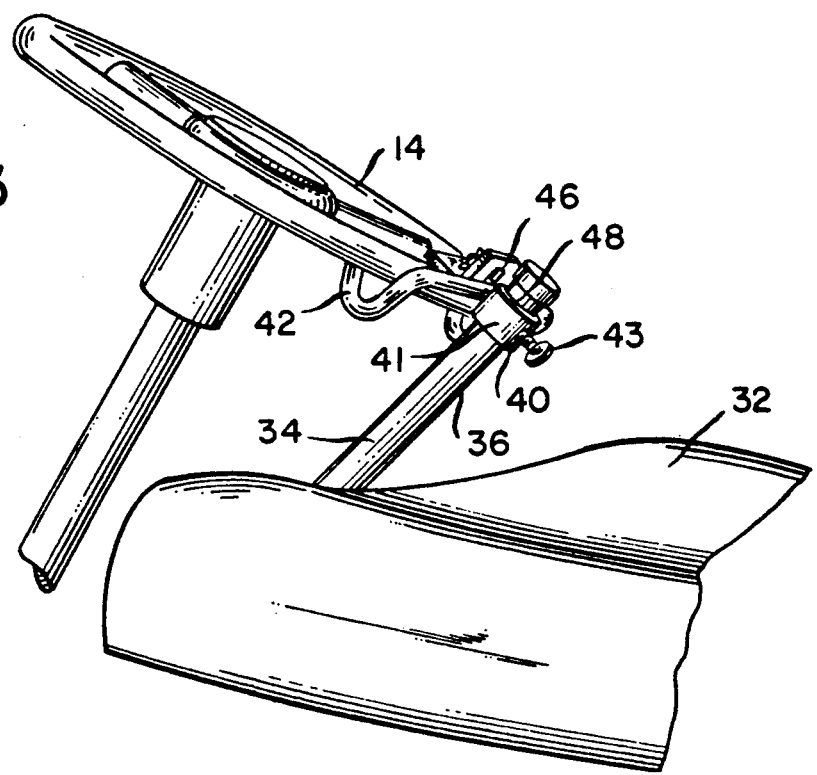
FIG. 3 is a perspective illustration of an embodiment of the upper end of the braking assembly of the present invention shown in position secured with respect to the steering wheel of a towed vehicle.
Figure 4:
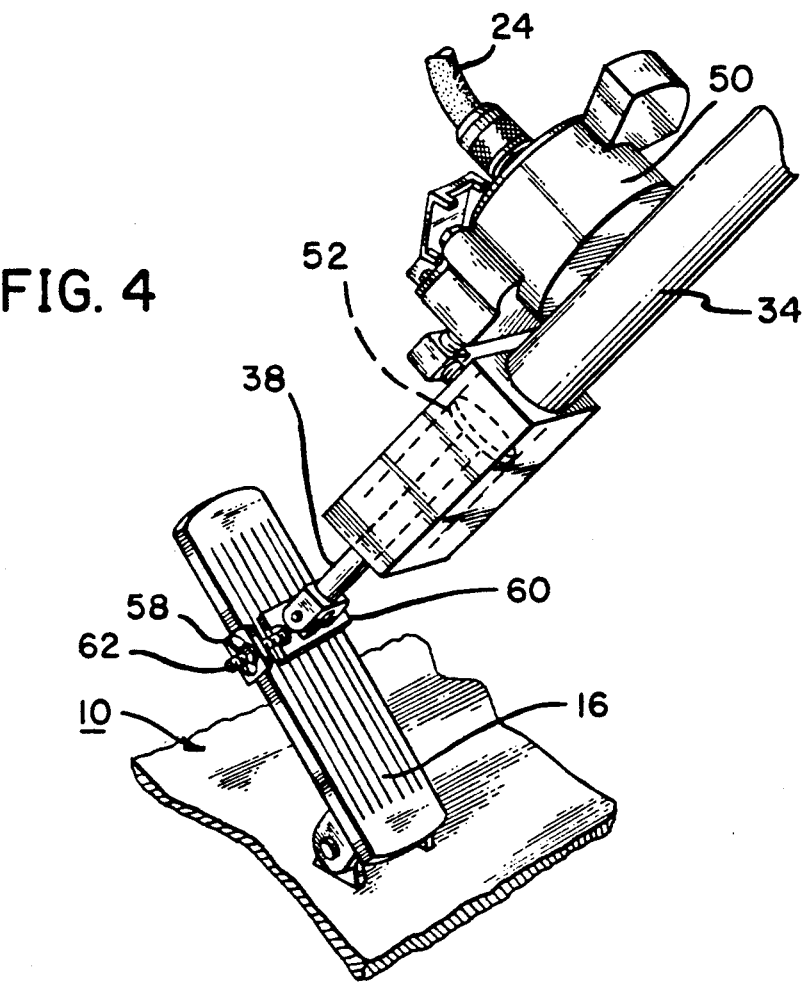
FIG. 4 is a perspective illustration of an embodiment of the braking assembly of the present invention shown in securement with respect to the brake pedal of a towed vehicle.

The present invention provides a means for applying the brakes of a towed vehicle remotely simultaneously as desired by the operator of the towing vehicle and preferably simultaneously with the application of the brakes of the towing vehicle. With the present invention as shown schematically in FIG. 1 a towed vehicle 10 is secured with respect to a towing vehicle 12 to be pulled thereby. The apparatus for remote application of the brakes includes an air compressor means 20 which is preferably operatively secured with respect to the towing vehicle 12. Air compressor 20 is preferably powered by the motor of the towing vehicle 12 such as to be gear driven or belt driven therefrom. Air compressor means 20 is adapted to supply compressed air to a compressed air storage means such as a tank 18. This storage means can comprise one or more tanks 18 mounted with respect to the towing vehicle 12. A pneumatic line means 22 extends from the compressed air storage tank 18 rearwardly to the passenger compartment of the towed vehicle 10. Preferably the pneumatic line means 22 is of a flexible resilient material since it extends rearwardly into the passenger compartment of the towed vehicle 10.

The pneumatic line means 22 includes a towing vehicle end means 26 secured in fluid flow communication with respect to the compressed air storage tank 18. The opposite end of the pneumatic line means 22 is defined as the towed vehicle end means 24 which is available to supply compressed air to the remote brake application device positioned within therein.

The towed vehicle 10 will include a steering wheel 14 and a brake pedal 16 therein. The braking assembly 30 positioned within the passenger compartment 32 of towed vehicle 10 will preferably include a rod member 34 positionable extending between the steering wheel 14 and brake pedal 16. Rod member 34 includes an upper end 36 which is detachably secured with respect to the steering wheel 14 of towed vehicle 10. In a similar manner the lower end 38 of the rod member 34 is detachably securable with respect to the towed vehicle brake pedal 16.

The rod member 34 of the remote brake application means of the present invention is adapted to be adjusted along its length through a rod length adjustment means 40. This rod length adjustment means 40 can be formed of a combination of a ring member 41 which comprises the manner of securement of the steering wheel securement bracket 42 with respect to the upper end 36 of rod member 34. Ring member 41 is preferably slidably movable along the length of rod member 34 adjacent the upper end 36 thereof. A set screw 43 may extend through the ring member 41 to facilitate frictional engagement between the shaft of rod member 34 and the ring member 41. Thus the length between the steering wheel securement bracket 42 and the pedal securement means 56 can be varied as desired.

Pedal securement means 56 is designed to be secured with respect to the towed vehicle brake pedal 16. Preferably pedal securement means 56 includes a first plate member 58 and a second plate member 60 positioned on opposite sides of the pedal 16 and threadably engaged with respect to one another by a threaded engaging member 62. With this configuration the rod member 34 will be detachably securable at the lower end 38 thereof with respect to the pedal 16 by way of pedal securement means 56. Also rod member 34 will be detachably securable at the upper end 36 thereof by way of the steering wheel securement bracket 42 with respect to the steering wheel 14 of towed vehicle 10. Adjustment of the distance between the pedal securement means 56 and the steering wheel securement bracket 42 is achieved by way of the rod adjustment means 48 described above as the ring member 41 movably positionable along the rod member 34.

The steering wheel securement bracket 42 will preferably include a U-shaped cradle member 44 and an upper securement yoke 46. When adjustability is included the upper securement yoke 46 will take the form of the ring member 41 and the set screw means 43.

A pneumatic control means 50 such as a pneumatic piston 52 will be positioned within the rod member 34. The pneumatic control means 50 will be in fluid flow communication with respect to the pneumatic line means 22. Control means 50 will be responsive to sensing pneumatic pressure within the pneumatic line means 22 to initiate expansion of the pneumatic piston means 52 causing downward pressure to be exerted upon the towed vehicle brake pedal 16 causing braking of the towed vehicle 10.

Preferably the towing vehicle 12 will include a pneumatic switch means 28 which may be manually or automatically controlled to send compressed air through the pneumatic line means 22 simultaneously with actuation of the brakes of the towing vehicle 12. The pneumatic switch means 28 will preferably be normally closed to prevent the supply of compressed air from storage tank 18 to the pneumatic line 22 until actuation of the brakes or operation of the manual switch is achieved. Once compressed air is supplied through pneumatic line means 22 it will continue down to the towed vehicle end 24 thereof to signal the pneumatic control means 50 to initiate operation of the pneumatic piston means 52 causing lengthening of the rod member 34 and pressing of the towed vehicle brake pedal 16.

Once braking is no longer required the brakes on the towing vehicle 12 will be released. Simultaneously the pneumatic switch means 28 will assume the normally closed position and additional pneumatic pressure will no longer be supplied through pneumatic line means 22.

In such a condition the pneumatic piston means 52 is in the expanded position. It is desirable to release the compressed air from the pneumatic piston 52 to facilitate contraction of rod member 38 to release the brakes on the towed vehicle 10. This is made possible by the air release valve means 54 which is operative responsive to the cessation of pneumatic pressure along pneumatic line means 22 to exhaust the compressed air from the pneumatic piston means 52. With this configuration release of the towing brake pedal 64 will simultaneously cause releasing of the towed vehicle brake pedal 16.

The apparatus of the present invention is particularly usable since the rod length adjustment means 40 provides a manner for usage of the remote brake application means in a great variety of different sizes of vehicles wherein the distance between the steering wheel and the brake pedal thereof can vary from two or three feet to as long as four or five feet. This advantage in addition to the portability of the apparatus of the present invention provides an advantage over any apparatus used previously. Also the use of pneumatic pressure as the controlling system is particularly adapted in view of the fact that most tow trucks have pneumatic powering systems already in place which can be tapped to facilitate operation of the remote brake application means of the present invention.

The present invention is particularly usable for the towing of very heavy vehicles wherein the weight of the entire unit comprising the towed vehicle and the towing vehicle can be three times that of the towing vehicle. On the other hand the brakes of the towing vehicle are only designed for braking the mass and weight of that vehicle itself. Thus the mass that must be braked against can be three or four times more than the brakes of the towing vehicle is designed to stop. For this reason the remote brake application means of the present invention is usable and the convenience of usage thereof will greatly increase highway safety.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A towed vehicle remote brake application means for use with a towing vehicle comprising:
   a) a compressed air storage means attached with respect to the towing vehicle for accumulating a supply of compressed air;
   b) an air compressor means attached with respect to said two vehicle and being in fluid flow communication with respect to said compressed air storage means to generate and supply compressed air thereto;
   c) a pneumatic line means including a towed vehicle end means and a towing vehicle end means, said towed vehicle end means being in fluid flow communication with respect to said compressed air storage means to receive compressed air selectively therefrom;
   d) a pneumatic switch means movable between a closed position preventing compressed air flow through said pneumatic line means and an opened position allowing full flow of compressed air through said pneumatic line means, said pneumatic switch means being responsive to the application of brakes in the towing vehicle to move to the opened position;
e) a braking assembly positioned within the passenger compartment of a towed vehicle between the brake pedal and steering wheel thereof and adapted to selectively exert bias against the brake pedal of the towed vehicle responsive to application of the brake pedal in the towing vehicle, said braking assembly comprising:
  (1) a rod member positioned extending from the steering wheel of the towed vehicle to the brake pedal thereof, said rod member including an upper end and a lower end defined thereon, said rod member including a rod adjustment means attached with respect thereto to adjust the distance between said upper rod end and said lower rod end, said rod adjustment means being pneumatically controlled;
  (2) a pedal securement bracket attached with respect to the lower end of said rod member, said pedal securement bracket adapted to be detachably securable with respect to the braking pedal of the towed vehicle to selectively secure said rod member with respect thereto;
  (3) a steering wheel securement bracket attached with respect to the upper end of said rod member, said steering wheel securement bracket adapted to be detachably securable with respect to the steering wheel of the towed vehicle to selectively secure said rod member with respect thereto;
  (4) a pneumatic control means secured with respect to said rod member and in fluid flow communication with respect to said pneumatic line means, said pneumatic control means being responsive to receiving pneumatic pressure through said towed vehicle end means of said pneumatic line means to extend said rod member between the steering wheel and braking pedal of the towed vehicle to exert downward bias against the braking pedal thereof to apply the brakes;
  (5) a pneumatic piston means in fluid flow communication with respect to said towed vehicle end of said pneumatic line means and being responsive to receiving compressed air therefrom to actuate and expand to urge said lower end of said rod means to exert bias against the brake pedal of the towed vehicle to actuate braking thereof, said pneumatic piston means being in axial alignment with respect to said rod means to facilitate axial movement and adjustability thereof; and
  (6) an air release valve means operative responsive to discontinuation of compressed air being supplied through said pneumatic line means to exhaust compressed air from within said pneumatic piston means to facilitate contraction thereof from the expanded position to cease braking of the towed vehicle.

2. A towed vehicle remote brake application means for use with a towing vehicle as defined in claim 1 wherein said compressed air storage means comprises a compressed air tank means adapted to receive and hold compressed air for use as needed.

3. A towed vehicle remote brake application means for use with a towing vehicle as defined in claim 1 wherein said air compressor means is operatively secured with respect to the motor of the towing vehicle to be driven thereby.

4. A towed vehicle remote brake application means for use with a towing vehicle as defined in claim 1 wherein said pneumatic line means is flexibly resilient to facilitate fluid flow communication between said air storage means and said braking assembly during movement of the towing and towed vehicles.

5. A towed vehicle remote brake application means for use with a towing vehicle as defined in claim 1 wherein said pneumatic switch means is manually movable between the opened position and the closed position.

6. A towed vehicle remote brake application means for use with a towing vehicle as defined in claim 1 wherein said pedal securement bracket includes:
  a) a first plate member;
  b) a second plate member; and
  c) a threaded engaging member attached to said first plate member and said second plate member for selectively securing said first and second plate members in engaging relationship with respect to one another with the pedal of the towed vehicle abuttingly engaged therebetween.

7. A towed vehicle remote brake application means for use with a towing vehicle as defined in claim 1 wherein said steering wheel securement bracket comprises:
  a) a U-shaped cradle adapted to bias against the undersurface of the steering wheel of the towed vehicle; and
  b) an upper securement yoke attached with respect to said rod member to facilitate secure attachment between the steering wheel of the towed vehicle and said rod member.

8. A towed vehicle remote brake application means for use with a towing vehicle as defined in claim 7 wherein said upper securement yoke is detachably securable with respect to said rod member to define a rod length adjustment means for use with variously sized towed vehicles.

9. A towed vehicle remote brake application means for use with a towing vehicle as defined in claim 8 wherein said securement yoke comprises:
  a) a ring member movable along said rod member for adjusting the longitudinal length between said upper end and said lower end thereof; and
  b) a set screw rotatably engaging and extending through said securement yoke for detachable frictional securement thereof with respect to said rod member.

10. A towed vehicle remote brake application means for use with a towing vehicle comprising:
  a) a compressed air storage means attached with respect to the towing vehicle for accumulating a supply of compressed air, said compressed air storage means comprising a compressed air tank member;
  b) an air compressor operatively secured with respect to said tow vehicle and being in fluid flow communication with respect to said compressed air storage means to generate and supply compressed air thereto, said air compressor means being driven by the motor of the towing vehicle;
  c) a pneumatic line means including a towed vehicle end means and a towing vehicle end means, said towed vehicle end means being in fluid flow communication with respect to said compressed air storage means to receive compressed air selectively therefrom, said pneumatic line means being flexibly resilient to facilitate fluid flow communication between said air storage means and said braking assembly during movement of the towing and towed vehicles;

d) a pneumatic switch means manually movable between a closed position preventing compressed air flow through said pneumatic line means and an opened position allowing full flow of compressed air through said pneumatic line means, said pneumatic switch means being responsive to the application of brakes in the towing vehicle to move to the opened position;

e) a braking assembly positioned within the passenger compartment of a towed vehicle between the brake pedal and steering wheel thereof and adapted to selectively exert bias against the brake pedal of the towed vehicle responsive to application of the brake pedal in the towing vehicle, said braking assembly comprising:
  (1) a rod member positioned extending from the steering wheel of the towed vehicle to the brake pedal thereof, said rod member including an upper end and a lower end defined thereon;
  (2) a pedal securement bracket attached with respect to the lower end of said rod member, said pedal securement bracket adapted to be detachably securable with respect to the braking pedal of the towed vehicle to selectively secure said rod member with respect thereto, said pedal securement bracket including:
    (a) a first plate member;
    (b) a second plate member; and
    (c) a threaded engaging member attached to said first plate member and said second plate member for selectively securing said first and second plate members in engaging relationship with respect to one another with the pedal of the towed vehicle abuttingly engaged therebetween;
  (3) a steering wheel securement bracket attached with respect to the upper end of said rod member, said steering wheel securement bracket adapted to be detachably securable with respect to the steering wheel of the towed vehicle to selectively secure said rod member with respect thereto, said steering wheel securement bracket comprising:
    (a) a U-shaped cradle adapted to bias against the undersurface of the steering wheel of the towed vehicle;
    (b) an upper securement yoke detachably securable with respect to said rod member to facilitate secure attachment between the steering wheel of the towed vehicle and said rod member and to allow for adjustment in the length of said rod member, said upper securement yoke comprising:
      (i) a ring member movable along said rod member for adjusting the longitudinal length between said upper end and said lower end thereof;
      (ii) a set screw rotatably engaging and extending through said securement yoke for detachable frictional engagement thereof with respect to said rod member;
  (4) a pneumatic control means secured with respect to said rod member and in fluid flow communication with respect to said pneumatic line means, said pneumatic control means being responsive to receiving pneumatic pressure through said towed vehicle end means of said pneumatic line means to extend said rod member between the steering wheel and braking pedal of the towed vehicle to exert downward bias against the braking pedal thereof to apply the brakes and to provide adjustability in the length of said rod means, said pneumatic control means further including a pneumatic piston means in axial alignment with respect to said rod means to facilitate axial movement and adjustability thereof, said pneumatic control means being in fluid flow communication with respect to said towed vehicle end of said pneumatic line means and being responsive to receiving compressed air therefrom to actuate and expand to urge said lower end of said rod means to exert bias against the brake pedal of the towed vehicle to actuate braking thereof; and
  (5) an air release valve means operative responsive to discontinuation of compressed air being supplied through said pneumatic line means to exhaust compressed air from within said pneumatic piston means to facilitate contraction thereof from the expanded position to cease braking of the towed vehicle.

* * * * *